June 16, 1964   C. CARON   3,137,257
CONTROL DEVICE FOR CONTROLLING THE POSITION OF A MACHINE ELEMENT
Filed Nov. 22, 1961
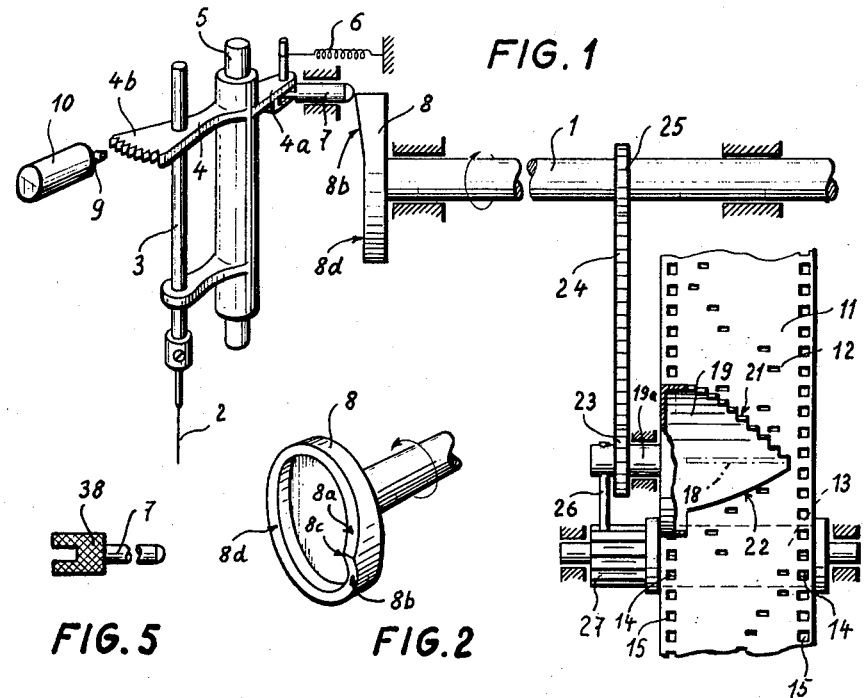
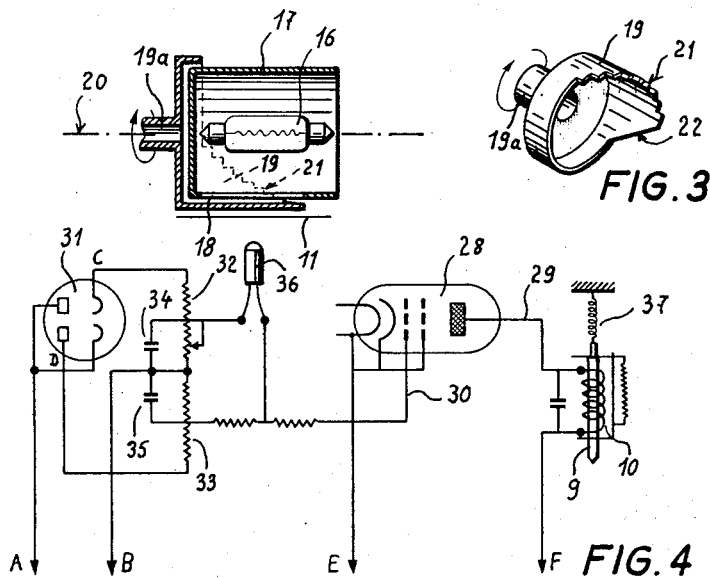
INVENTOR
Charles CARON
By
       Attorney

United States Patent Office 3,137,257
Patented June 16, 1964

3,137,257
CONTROL DEVICE FOR CONTROLLING THE POSITION OF A MACHINE ELEMENT
Charles Caron, Geneva, Switzerland, assignor to Mefina S.A., Fribourg, Switzerland, a firm of Switzerland
Filed Nov. 22, 1961, Ser. No. 154,211
Claims priority, application Switzerland Nov. 26, 1960
10 Claims. (Cl. 112—158)

The present invention relates to a control device for controlling the position of a machine element, especially for controlling the position of the needle bar or of the work feed device of a sewing machine provided with a main shaft.

This control device is characterised in that it comprises a mechanism for driving the said element, controlled by the main shaft of the machine, imparting to the said element a reciprocatory movement causing it to scan the area of the various working positions which it is capable of occupying, at the rate of one reciprocation per revolution of the said main shaft, this mechanism acting positively in one direction of the displacements of the said element, while the displacements in the opposite direction are produced by a resilient return device, a programme mechanism in which the programme comprises several information tracks, each determining one working position of the said element, and advances step by step at the rate of one progression per revolution of the main shaft of the machine, this programme mechanism comprising a movable exploratory member controlled by the main shaft of the machine and scanning all the tracks of the said programme once for each revolution of the said main shaft, an electronic control device receiving a pulse each time the scanning device encounters any information of the programme, and a stop mechanism controlled electrically by the said electronic device and acting on the said element with the return movements of this latter, controlled by the said resilient return device, in order to block the said element in a position thus determined by the programme.

The accompanying drawing shows, by way of example, one embodiment of the arrangement according to the invention and a variant thereof.

FIG. 1 is a general diagrammatic view of a part of a sewing machine, in which are shown only those elements which are necessary for understanding the invention.

FIGS. 2 and 3 are perspective views of two details of the machine.

FIG. 4 is a diagram of the electronic control device, with a section of part of the programme mechanism, and FIG. 5 is a plan view of a detail of a modification.

Like the conventional sewing machines, the machine illustrated comprises a main shaft 1 extending longitudially in the arm of the machine (not shown) and which controls the various sewing functions. The needle indicated at 2 is fixed to a needle-holding bar 3, which itself is mounted in a cradle 4. The latter is pivoted on a shaft 5 belonging to the machine frame. The needle could also be mounted in accordance with a known "pendular" arrangement. One arm 4a of the cradle is under the action of a return spring 6 which urges this arm, by means of a plunger 7 pivoted thereon, against a barrel cam 8 carried by the front end of the main shaft 1. With each complete revolution of this shaft, the cradle thus carries out an oscillatory movement, during which the needle sweeps over the complete area of the different working positions which it is capable of occupying.

The cradle 4 also comprises a toothed sector 4b co-operating with a stop pin 9 forming the core of an electromagnet 10. When the latter is energised, the stop pin 9 is engaged in the teeth of the sector 4b and thus locks the cradle in the position it occupies at the time.

The machine illustrated comprises a programme mechanism. The latter comprises an opaque film 11 having ten longitudinal tracks comprising translucent windows 12. This film is driven step by step by a driving cylinder 13 having two teeth 14 entering the perforations 15 formed in the margins of the film. The latter could be wound on to two spools or constitute an endless band of annular form. The programme mechanism also comprises a light source 16 (FIG. 4) disposed inside a fixed cylindrical housing 17 having a rectilinear slot 18 disposed opposite the film. An inwardly curved blade 19 in the form of the wall of a cylinder is mounted to rotate about a shaft 20 coincident with its axis and which extends transversely in relation to the film 11. The two edges 21 and 22 of the blade 19 are helical, the edge 21 being also of stepped form. The hub 19a of the blade 19 carries a toothed pinion 23, with which meshes a chain 24 driven by a toothed pinion 25 carried by the main shaft 1. Thus, the blade 19, like the cam 8, rotates in synchronism with the main shaft. The rotation of the cylinder 13 driving the film 11, and consequently the advance of the latter, is effected step by step by means of a control pin 26 carried by the hub 19a of the blade 19 and which co-operates with a star-shaped toothing of a toothed pinion 27 fast with the cylinder 13. A spring device (not shown) co-operates with the pinion 27 in order to ensure that the film is steady when at rest.

The machine also comprises an electronic control device, as shown in FIG. 4. This mechanism comprises a thyratron 28, the output 29 of which feeds the electromagnet 10 of the stop pin 9, and the grid 30 of which is maintained at a positive polarity supplied by a double diode 31, forming a voltage doubler with resistances 32 and 33 and capacitances 34 and 35. This positive polarity applied to the grid 30 holds the thyratron 28 blocked, so that the electromagnet 10 is not fed. A photoelectric cell 36, for example a germanium photo-diode, is placed opposite the slot 18 in the fixed housing 17, on the other side of the film 11 with respect to this housing. This photoelectric cell, when it is excited, produces a weak voltage of the order of a few millivolts, which is applied directly to the grid 30 of the thyratron. Deducted from the aforementioned positive polarity, this weak voltage due to the photoelectric cell is sufficient to unblock the thyratron, which functions as an electronic relay, and which then feeds the electromagnet 10 controlling the stop pin 9.

The machine described and illustrated operates in the following manner:

When the blade 19 is disposed opposite the slot 18, as shown in the drawing, it forms a screen and intercepts the light rays from the source 16 so that the cell 36 is not excited; the thyratron is blocked and the pin 9 occupies its rest position, permitting the needle cradle 4 to oscillate freely. Corresponding to this position of the blade 19 is the position of the cam 8 in which its apex 8c, located between its rising portion 8a and its descending portion 8b is in engagement with the plunger 7.

The descending portion 8b then starts to move in front of the plunger, enabling the cradle 4 to move rearwardly under the action of the return spring 6. During this movement, the "trailing" edge 21 of the screen 19, the steps of which successively pass in front of the slot 18, uncovers that one of the windows 12 in the film which is then opposite the said slot. At this instant, the light rays of the source 16 reach the cell 36, which unblocks the thyratron, bringing the stop pin 9 into engagement with the toothing 4b and thus locking the cradle in the position which it occupied at the instant when the window 12 in question was uncovered by the screen 19. The cam 8 continues to turn idly, the cradle 4 not following it because it is locked; the sewing stitch passes through the fabric during this time. The screen 19 then comes opposite the slot 18 again with its helical leading edge 22 at the same time as the rise 8a of the cam acts on the plunger 7. When the edge 22 again covers the window 12, the cell 36 is no longer excited and the locking pin 9 is released under the action of the return spring 37. The slope of the edge 22 of the screen 19 is related to the slope of the rise 8a on the cam, so that the cam "takes up" the cradle at the instant that the latter is released without the plunger 7 producing any shock on the cam.

The instantaneous advance by one step of the film 11 is produced at the moment when the slot 18 is completely covered by the screen 19, that is to say, in the position shown in the drawing, which corresponds to the extreme position of the cradle, when the apex 8c of the cam is disposed opposite the plunger 7. A new window 12 in the film 11 is then situated opposite the slot 18; the position of this window, that is to say, the film track to which it belongs, determines at what angular position the screen 19 will uncover it and consequently at what position, with the return of the cradle, its locking will be effected. It is to be pointed out that the trailing edge 21 of the screen 19 is cut in step formation, the size of each graduation corresponding to the size of the windows 12, so that the latter are suddenly and not progressively uncovered, as would be the case if the edge 21 were continuous, like the edge 22, this improving the precision and rapidity of response of the control device. The accuracy of the position of the cradle, when it is locked, is further increased by the fact that the end of the stop pin 9 has two bevels engaging in the toothing 4b.

By way of indication, it is to be pointed out that the trailing edge 21 of the screen 19 covers an angular range of about 100°, measured from the centre of rotation of the screen, this corresponding to the angular range of the descending slope 8b of the cam, measured from the centre of the latter, while the angular range of the leading edge 22 corresponds to the angular range of the rising surface 8a of the cam.

In the example illustrated, the film has ten tracks, corresponding to ten different positions of the cradle, but this number could be different. It is to be noted that the last track, on the left of the film in FIG. 1, could even be omitted without this decreasing by one unit the number of possible positions of the cradle, because the last track corresponds to the position of the cradle in which the latter bears on the flat part 8d of the cam 8.

The supply to the input terminals AB of the voltage doubler will for example be at a voltage of 115 volts, alternating current, so that the output at CD from the double diode would then supply a voltage of about 250 volts, the two alternations being rectified. The thyratron will be supplied at EF, for example, with alternating voltage of 115 volts.

As a modification, it will be possible to provide for the use of a gas-type or vacuum-type photoelectric cell with ignition voltage, instead of the germanium photo diode 36. It will also be possible for the operation to be carried out by blocking the thyratron instead of unblocking the same; nevertheless the unblocking is more precise and permits of a greater power being supplied to the electromagnet 10.

As another modification, the rotary screen 19 could be replaced by a flat sliding screen with an alternating movement, which effects a complete reciprocation with each revolution of the main shaft, in synchronism with the oscillations of the cradle.

The control arrangement described and illustrated could also be applied to the fabric-feeding device instead of to the needle. The said fabric-feed device, indicated at 38 in FIG. 5, will be connected to the control plunger 7 instead of the needle cradle 4. It may be advantageous for the feed device not to be controlled directly, but for an intermediate selector member, known in the sewing machine art, to be controlled, the said selector determining the amplitude of the movements of the feed device produced by the machine motor.

What I claim is:

1. In a control device for controlling the position of a machine element, especially for controlling the position of the needle bar or of the work feed device of a sewing machine provided with a main shaft: a mechanism for driving the said element, controlled by the said main shaft, imparting to the said element a reciprocatory movement causing it to scan the area of the various working positions which it is capable of occupying, at the rate of one reciprocation per revolution of the said main shaft, this mechanism acting positively in one direction of the displacements of the said element; a resilient return device producing the displacements of the said element in the opposite direction; a programme mechanism comprising a light source and a film having several information tracks, each track having opaque portions and translucent portions, and each track determining one working position of the said element; means controlled by the said main shaft for producing the advance of the said programme step by step at the rate of one progression per revolution of the said main shaft; a movable exploratory screen controlled by the main shaft of the machine, scanning all the tracks of the said film once for each revolution of the said main shaft; an electronic control device comprising a photoelectric cell lighted by the said source of light through the said film, said control device receiving a pulse each time the said screen intercepts the light passing through the said film, the position of the screen in which this interception occurs depending on the position of the information on the film, and a stop mechanism controlled electrically by the said electronic device and acting on the said element during the return movements of this latter, controlled by the said resilient return device, in order to block the said element in a position thus determined by the programme.

2. In a control device for controlling the position of a machine element, especially for controlling the position of the needle bar or of the work feed device of a sewing machine provided with a main shaft: a mechanism for driving the said element, controlled by the said main shaft, imparting to the said element a reciprocatory movement causing it to scan the area of the various working positions which it is capable of occupying, at the rate of one reciprocation per revolution of the said main shaft, this mechanism acting positively in one direction of the displacements of the said element; a resilient return device producing the displacements of the said element in the opposite direction; a programme mechanism comprising a light source and a film having several information tracks, each track having opaque portions and translucent portions, and each track determining one working position of the said element; means controlled by the said main shaft for producing the advance of the said programme step by step at the rate of one progression per revolution of the said main shaft; a movable exploratory screen formed by an inwardly curved blade in the form of the wall of a cylinder, at least one edge of which is helical, mounted to rotate about an axis coinciding with the axis of the said cylinder wall, and which is directed transversely with respect to the direction of the programme tracks, the said blade being controlled by the said main shaft, the light source being disposed inside the cylinder described by the said blade during its rotation, the arrangement being such that the angular position of the said blade, when it uncovers a programme information, varies with the track in which the said information is located, an electronic control device comprising a photoelectric cell lighted by the said source of light through the said film, said control device receiving a pulse each time the said screen intercepts the light passing through the said film, the position of the screen in which this interception occurs depending on the position of the information on the film, and a stop mechanism controlled electrically by the said electronic device and acting on the said element during the return movements of this latter, controlled by the said resilient return device, in order to block the said element in a position thus determined by the programme.

3. In a control device as claimed in claim 2, a rotatable cam producing the displacements of the said machine element, the said helical edge of the said blade covering an angular distance, measured from the centre of rotation of the blade, corresponding to the angular distance of the descending slope of the said cam, controlling the "return" movements of the said element.

4. Control device as claimed in claim 2, in which the said helical edge of the said blade, constituting its "trailing" edge, is in step formation, the size of each step corresponding to the size of each programme track.

5. Control device as claimed in claim 2, in which the "leading" edge of the said blade, opposite to the said helical edge, is also helical.

6. Control device as claimed in claim 2, in which the "leading" edge of the said blade, opposite to the said helical edge, is also helical, the angular distance of the second helical edge of the blade, measured from the centre of rotation of the latter, corresponding to the angular distance of the rising slope of the said cam, controlling the "forward" movement of the said element.

7. Control device as claimed in claim 2, in which the "leading" edge of the said blade, opposite to the said helical edge, is also helical, in which the angular distance of the second helical edge of the blade, measured from the centre of rotation of the latter, corresponds to the angular distance of the rising slope of the said cam, controlling the "forward" movements of the said element, and in which the relative setting between the said blade and the said cam is such that the first helical edge of the blade comes opposite the film at the instant when the descending slope of the said cam becomes operative.

8. In a control device as claimed in claim 2, a fixed tubular screen co-axial with the said blade, surrounding the light source, this screen being formed with a rectilinear slot opposite the film.

9. In a control device as claimed in claim 2, a thyratron the output of which controls the said electric stop mechanism, and to the grid of which is directly applied a voltage produced by the said photoelectric cell, when it receives the rays from the light source.

10. In a control device as claimed in claim 2, a thyratron the output of which controls the said electric stop mechanism and to the grid of which is applied on the one hand a positive polarity, holding it blocked, and on the other hand a negative voltage produced by the said photoelectric cell when it receives the rays from the light source, said negative voltage being subtracted from the said positive polarity and unblocking the thyratron.

References Cited in the file of this patent

UNITED STATES PATENTS

| 2,677,815 | Brustman | May 4, 1954 |
| 2,710,934 | Senn | June 14, 1955 |
| 3,005,137 | Caron | Oct. 17, 1961 |
| 3,005,427 | Engel | Oct. 24, 1961 |

FOREIGN PATENTS

| 566,563 | Belgium | Apr. 30, 1958 |
| 342,826 | Switzerland | Jan. 15, 1960 |